United States Patent
Chan et al.

(10) Patent No.: US 9,818,406 B1
(45) Date of Patent: Nov. 14, 2017

(54) ADJUSTING USER EXPERIENCE BASED ON PARALINGUISTIC INFORMATION

(71) Applicant: INTUIT INC., Mountain View, CA (US)

(72) Inventors: Raymond Chan, San Diego, CA (US); Igor A. Podgorny, Mountain View, CA (US); Benjamin Indyk, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/191,265

(22) Filed: Jun. 23, 2016

(51) Int. Cl.
| | | |
|---|---|---|
| G10L 15/00 | (2013.01) | |
| G10L 17/00 | (2013.01) | |
| G10L 21/00 | (2013.01) | |
| G06F 17/27 | (2006.01) | |
| G06F 17/21 | (2006.01) | |
| G10L 15/22 | (2006.01) | |
| G10L 25/63 | (2013.01) | |
| G10L 15/02 | (2006.01) | |
| G06F 3/16 | (2006.01) | |

(52) U.S. Cl.
CPC ............. *G10L 15/22* (2013.01); *G06F 3/167* (2013.01); *G10L 15/02* (2013.01); *G10L 25/63* (2013.01); *G10L 2015/223* (2013.01)

(58) Field of Classification Search
CPC . G10L 15/005; G10L 15/065; G10L 15/1822; G10L 17/30684; G10L 17/30705; G10L 17/30976; G10L 17/30516; G10L 17/30554; G10L 17/30693; G10L 17/30699; G10L 17/30867; G10L 21/028; G06F 17/274; G06F 17/2785; G06F 17/279; G06F 17/2705; G06F 17/34401; G06F 17/30445; G06F 17/30598; G06F 17/30684; G06F 17/30705; G06F 17/30976
USPC ..... 704/9, 10, 207, 208, 246, 250, 251, 255, 704/270
See application file for complete search history.

(56) References Cited

U.S. PATENT DOCUMENTS

| | | | |
|---|---|---|---|
| 7,203,635 B2 * | 4/2007 | Oliver | G06K 9/6293 345/156 |
| 7,778,831 B2 * | 8/2010 | Chen | G10L 15/065 704/207 |

(Continued)

OTHER PUBLICATIONS

D. Verma and D. Mukhopadhyay, "Age driven automatic speech emotion recognition system," 2016 International Conference on Computing, Communication and Automation (ICCCA), Noida, 2016, pp. 1005-1010.*

*Primary Examiner* — Edgar Guerra-Erazo
(74) *Attorney, Agent, or Firm* — Patterson & Sheridan LLP

(57) ABSTRACT

Techniques are disclosed for adjusting user experience of a software application based on paralinguistic information. One embodiment presented herein includes a computer-implemented method for adjusting a user experience of a software application. The method comprises receiving, at a computing device, an audio stream comprising audio of a user. The method further comprises analyzing the audio stream for paralinguistic information to determine an attribute of the user. The method further comprises identifying content of the audio stream. The method further comprises determining one or more actions based on the content of the audio stream. The method further comprises selecting at least one of the one or more actions based on the attribute of the user.

20 Claims, 7 Drawing Sheets

(56) References Cited

U.S. PATENT DOCUMENTS

| | | | | |
|---|---|---|---|---|
| 8,010,358 B2* | 8/2011 | Chen | ...................... | G10L 15/065 |
| | | | | 704/207 |
| 8,050,922 B2* | 11/2011 | Chen | ...................... | G10L 15/065 |
| | | | | 704/207 |
| 8,429,106 B2* | 4/2013 | Downs | ................ | G06F 17/2745 |
| | | | | 706/21 |
| 8,756,057 B2* | 6/2014 | Miller | .................. | G09B 21/009 |
| | | | | 704/235 |
| 9,230,562 B2* | 1/2016 | Miller | .................. | G09B 21/009 |
| 9,269,374 B1* | 2/2016 | Conway | ............. | G06K 9/00302 |
| 2004/0030750 A1* | 2/2004 | Moore | .................. | G10L 15/265 |
| | | | | 709/204 |
| 2006/0122840 A1* | 6/2006 | Anderson | ............. | G10L 13/033 |
| | | | | 704/275 |
| 2008/0189096 A1* | 8/2008 | Apte | ...................... | G06F 9/4448 |
| | | | | 704/2 |
| 2009/0100050 A1* | 4/2009 | Erol | ................. | G06F 17/30026 |
| 2013/0241952 A1* | 9/2013 | Richman | .................. | G06F 17/21 |
| | | | | 345/619 |
| 2015/0019216 A1* | 1/2015 | Singh | ................... | G10L 15/183 |
| | | | | 704/235 |
| 2015/0234636 A1* | 8/2015 | Barnes, Jr. | ............... | G06F 3/167 |
| | | | | 715/728 |
| 2016/0217472 A1* | 7/2016 | Podgorny | ............ | G06Q 40/123 |

* cited by examiner

ADJUSTING USER EXPERIENCE BASED ON PARALINGUISTIC INFORMATION

FIELD

The present disclosure relates to techniques for adjusting a user experience in a software application based on paralinguistic information.

BACKGROUND

Complex software applications and services are frequently made available to users over computer networks, such as the Internet. For example, software applications used to prepare and file income tax returns are frequently offered as an online service. In addition to generating tax return documents, these online services typically guide a user through a collection of complex interactive workflows in order to prepare a complete, valid income tax return.

Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications which allow users to complete mortgage applications or apply for home, life, or automobile insurance.

In addition to these primarily transactional online services, a variety of complex software tools offer users access to both online services and local client applications, e.g., financial accounting software, video editing or media composition software, software development tools, etc. Such applications may allow users to access application features and user data stored online, regardless of whether the application is installed locally by an end user or accessed as an online service. Once customer data is stored by a service provider, end users can access their data using a variety of clients, including a web browser used to access a software application as a series of web pages, dedicated "thin" client applications, and so-called "apps" accessed using a mobile telephone or computing tablet.

Service providers often publish help content, user guides, and other documentation to assist users in accomplishing a given task, explain a given feature, or describe information related to the service (e.g., the requirements a user must satisfy to qualify for a given tax credit or the consequences of different choices or elections a user can make in filing a tax return). In addition, service providers often host online forums or communities where users can post questions, comments, and guides related to the features, use, or purpose of an online service, as well as respond to questions or comment on posts submitted by other users. For popular applications and services, user generated content can become a significant source of information and insight about a software application and related topics.

SUMMARY

One embodiment presented herein includes a computer-implemented method for adjusting a user experience of a software application. The method comprises receiving, at a computing device, an audio stream comprising audio of a user. The method further comprises analyzing the audio stream for paralinguistic information to determine an attribute of the user. The method further comprises identifying content of the audio stream. The method further comprises determining one or more actions based on the content of the audio stream. The method further comprises selecting at least one of the one or more actions based on the attribute of the user.

Another embodiment presented herein includes a computing device for adjusting a user experience of a software application. The computing device comprises a memory and a processor. The processor is configured to receive an audio stream comprising audio of a user. The processor is further configured to analyze the audio stream for paralinguistic information to determine an attribute of the user. The processor is further configured to identify content of the audio stream. The processor is further configured to determine one or more actions based on the content of the audio stream. The processor is further configured to select at least one of the one or more actions based on the attribute of the user.

Another embodiment presented herein includes a computing device for adjusting a user experience of a software application. The computing device comprises means for receiving an audio stream comprising audio of a user. The computing device further comprises means for analyzing the audio stream for paralinguistic information to determine an attribute of the user. The computing device further comprises means for identifying content of the audio stream. The computing device further comprises means for determining one or more actions based on the content of the audio stream. The computing device further comprises means for selecting at least one of the one or more actions based on the attribute of the user.

Another embodiment presented herein includes a computer-readable medium comprising instructions that when executed by a computing device cause the computing device to perform a method for adjusting a user experience of a software application. The method comprises receiving, at a computing device, an audio stream comprising audio of a user. The method further comprises analyzing the audio stream for paralinguistic information to determine an attribute of the user. The method further comprises identifying content of the audio stream. The method further comprises determining one or more actions based on the content of the audio stream. The method further comprises selecting at least one of the one or more actions based on the attribute of the user.

Another embodiment presented herein includes a computer-implemented method for adjusting a ranking of information content of a software application based on feedback from a user. The method comprises receiving, at a computing device, an audio stream comprising audio of the user, the audio being indicative of feedback related to information content. The method further comprises analyzing the audio stream for paralinguistic information to determine an attribute of the user. The method further comprises adjusting a ranking of the information content based on at least one of the feedback and additional feedback and the determined attribute of the user.

Another embodiment presented herein includes a computing device for adjusting a ranking of information content of a software application based on feedback from a user. The computing device comprises a memory and a processor. The processor is configured to receive an audio stream comprising audio of the user, the audio being indicative of feedback related to information content. The processor is further configured to analyze the audio stream for paralinguistic information to determine an attribute of the user. The processor is further configured to adjust a ranking of the information content based on at least one of the feedback and additional feedback and the determined attribute of the user.

Another embodiment presented herein includes a computing device for adjusting a ranking of information content of a software application based on feedback from a user. The computing device comprises means for receiving an audio stream comprising audio of the user, the audio being indicative of feedback related to information content. The computing device further comprises means for analyzing the audio stream for paralinguistic information to determine an attribute of the user. The computing device further comprises means for adjusting a ranking of the information content based on at least one of the feedback and additional feedback and the determined attribute of the user.

Another embodiment presented herein includes a computer-readable medium comprising instructions that when executed by a computing device cause the computing device to perform a method for adjusting a ranking of information content of a software application based on feedback from a user. The method comprises receiving, at a computing device, an audio stream comprising audio of the user, the audio being indicative of feedback related to information content. The method further comprises analyzing the audio stream for paralinguistic information to determine an attribute of the user. The method further comprises adjusting a ranking of the information content based on at least one of the feedback and additional feedback and the determined attribute of the user.

DETAILED DESCRIPTION

Figure 1:
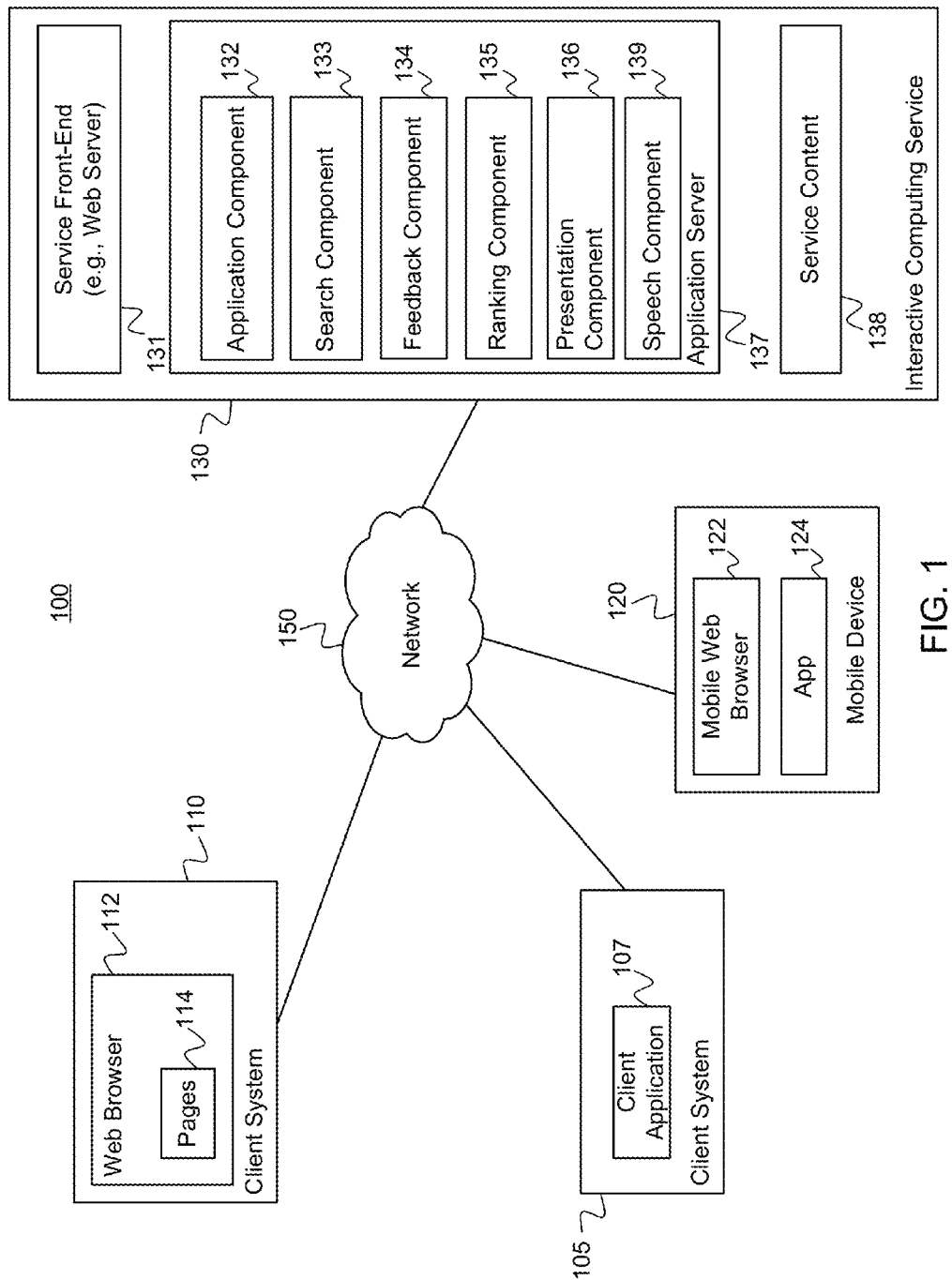
FIG. 1 illustrates an example of a computing environment used to provide an interactive computing service, according to one embodiment.

Embodiments presented herein provide techniques for adjusting a user experience for software, software interfaces, and information content based on paralinguistic information of voice/speech of a user. Additionally, the techniques may provide for adjusting the user experience based on the content of the voice/speech (e.g., query, phrase, voice-of-customer feedback, etc.) of the user.

For example, a user of a software application may interact with the software application using a voice-user interface (VUI). The user may accordingly use voice/speech to initiate services or processes in the software application. In particular, voice/speech of the user may be captured as an audio stream by a computing device running the software application. The computing device may process the audio stream to extract paralinguistic information from the audio stream.

Paralinguistic technically means "alongside linguistics" and therefore deals with those phenomena that are modulated onto or embedded into a verbal message, including acoustics and linguistics of the verbal message. For example, low level descriptors may be extracted from frames of the audio stream (e.g., 10-30 ms frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the linguistic low level descriptors may include linguistic entities (phoneme sequences, word sequences, etc.), non-linguistic strings (laughter, sighs, etc.), and/or disfluencies (false starts, filled/unfilled pauses, etc.). The paralinguistic information may be extracted utilizing known techniques or software, such as, EmoVoice, OpenEar, Yaafe, Voice Search DB with Accent and Tone, VoiceVault, AT&T APIs, etc.

Such paralinguistic information of the voice/speech of the user may be utilized to determine one or more attributes of the user. For example, the low level descriptors extracted from the audio stream may be compared to a speech database that stores attributes correlated to different low level descriptors. Therefore the low level descriptors extracted from the audio stream can be matched to different attributes. The attributes that may be determined may include gender of the user, age (or age range) of the user, one or more emotional states of the user (e.g., angry, afraid, positive, negative, joyful, happy, bored, alert, tranquil, excited, warm, aggressive, friendly, gloomy, etc.). It should be noted that the attributes may not always be determined correctly, and may only be determined with a probability that they are correct. However, the techniques herein may attribute the determined attribute to the user anyway, or if the probability is below a threshold, may not attribute the determined attribute to the user, or may prompt the user to input the voice/speech again.

The paralinguistic information may be used to adjust a user experience for the software application. For example, the one or more attributes of a user determined based on the paralinguistic information may be used to select a particular user interface to display to the user (e.g., feedback screen, assisted support screen, customer content screen, survey screen, etc.), select particular content to display to the user (e.g., user generated answer to query, frequently asked questions (FAQ) content, filter content displayed, order/rate/rank content displayed, etc.), route the user to a particular process (e.g., communication with an assisted support system (e.g., live chat)), etc. In some embodiments, the paralinguistic information may be utilized to modify the user experience (e.g., user interface, question order, etc.) of the software application in any number of ways, such as described in U.S. application Ser. No. 14/286,736, filed May 23, 2014, which is hereby expressly incorporated by reference in its entirety.

In some embodiments, the paralinguistic information may be utilized as metadata that is correlated with and/or used to annotate content (e.g., using extensible markup language (XML) like language, emotional markup language (EML), etc.). For example, the attributes of a user, determined based on the paralinguistic information, that generates content or provides feedback on the content may be stored along with the content. Such paralinguistic information associated with the content may be utilized to select, order, or rank the content stored, such as for search results of a search that may be performed.

For example, the software application may prompt users for voice-of-customer feedback regarding the usefulness or quality of information content (e.g., self-support content, assisted support content, etc.). Self-support content, in particular, may include information content (or content items) such as help content, user guides, documentation, user generated content, etc., that aids a user in interacting with the software application or online service. Using an online tax preparation service as a reference example, self-support content for such a service may allow users to search for help content, user guides, etc., related to a particular topic (such as the requirements needed to qualify for a given tax credit). Assisted support content, typically provided when a customer interacts with a support agent, can provide additional assistance to users. For example, users can receive assisted support via chat rooms, technical support calls, and the like, to accomplish a particular task. Examples of assisted support content include forum posts, chat rooms, and the like, where the user typically receives additional assistance regarding a particular task.

The software application may prompt users for structured feedback and/or unstructured feedback and rank the usefulness of the content based on such feedback, such as described in U.S. application Ser. No. 15/094,653, filed Apr. 8, 2016, which is hereby expressly incorporated by reference in its entirety. For example, a user may provide structured feedback in the form of up or down votes (or yes/no answers) to indicate whether that particular user was satisfied or dissatisfied with information content presented to the user while interacting with the software application. As another example, online services often use a star rating system (or other scale) to allow users to provide structured feedback characterizing the quality or usefulness of information content (e.g., in a five star rating system, five stars may indicate the highest quality). In some examples, the structured feedback may be received as a touch input, text, or other non-audio based input.

At the same time, the software application may prompt users for more detailed (unstructured) voice-of-customer feedback about their experience interacting with a software application or online service. For example, users may provide user comments, product reviews, exit surveys, etc., regarding quality or usefulness of the information content. Compared to structured feedback, unstructured feedback may provide a more express indication of user sentiment regarding the quality of the information content. In particular, users can specify whether the information content was relevant or helpful and provide reasons why the content was relevant or helpful. Similarly, users can specify whether the self-support content was not relevant or unhelpful and explain why the information was not helpful.

The software application may prompt the user for unstructured feedback in the form of voice/speech of the user, which may be captured as an audio stream by a computing device running the software application. The computing device may then extract paralinguistic information from the audio stream and determine one or more attributes of the user based on the extracted paralinguistic information. The one or more attributes of the user may be used to better indicate the user sentiment regarding the quality of the information content. For example, an emotion of the user may be determined, and may further be used to determine whether the self-support content was of lower quality and not relevant or unhelpful (e.g., if the emotion is negative) or of higher quality and relevant and helpful (e.g., if the emotion is positive). The content may then be selected, ordered, ranked, etc. for relevance based on the paralinguistic information in the unstructured feedback, and in some embodiments, may optionally additionally be ranked on structured feedback and/or the actual content of the unstructured feedback.

In some embodiments, speech recognition (e.g., utilizing known techniques or software, such as, natural language processing, Hidden Markov models, neural networks, deep feedforward and recurrent neural networks, etc.) may also be performed by the computing device on the audio stream to extract words spoken by the user. The words extracted from the audio stream may be indicative of one or more topics (e.g., query, keywords, content, etc.). For example, the words extracted from the audio stream may be utilized to identify one or more topics (e.g., each related to different content), or identify content directly. The extracted words may be utilized as input to a search algorithm (e.g., natural language search) that identifies the one or more topics and/or the corresponding content as the results of the search. The one or more topics and/or corresponding content may be ranked in relevance to the extracted words. In some embodiments, the relevance of the content may be based on paralinguistic information associated with the content as discussed above.

The paralinguistic information extracted from the audio stream may be utilized to refine the content identified and/or select a particular action to perform. For example, if the content is associated with metadata indicative of an attribute of a user (e.g., identifier of the attribute, paralinguistic information, etc.), the content may further be refined or a subset of the content selected based on matching or correlating the attributes associated with the content with the attributes of the user of the audio stream. The attribute of the user may further be used to refine the content based on the topic that the content is related to.

In another example, the audio stream may include words indicative of a query, such as, "Is the application worth the cost?". The search algorithm may identify one or more topics and/or corresponding content related to the query, such as, an answer generated by another user of the software, and an answer that is part of a FAQ created by the developer of the software. The paralinguistic information may further be utilized to determine an emotional state of the user. If the emotional state of the user is positive, the answer that is part of the FAQ created by the developer of the software may be displayed to the user, as the user seems to be having a positive experience with the software and thus may trust the developer. If the emotional state of the user is negative, the answer that is generated by another user of the software may be displayed to the user, as the user seems to have a negative experience with the software and thus may trust another user instead of the developer of the software.

It should be noted, that it may be possible to further extract information about the emotions of a user from the actual words included in the audio stream. However, use of paralinguistic information to determine an emotional state of the user may provide a more accurate measure of the emotional state of the user than the information extracted from the actual words. For example, a specific set of words (e.g., "Is the application worth the cost?") may be spoken with a negative or neutral tone that may not be detectable by mere natural language processing to extract the words from the audio stream alone. Accordingly, using paralinguistic information to determine attributes of a user may more accurately determine attributes of the user as compared to other methods, such as natural language processing.

Different aspects of these techniques are described in more detail herein, along with additional examples of how the techniques may be used to adjust the user experience of a software application.

It should be noted that though in certain examples described herein, the computing device that captures the audio stream is described as performing certain tasks (e.g., extracting paralinguistic information, speech recognition, action selection, etc.) such tasks may be performed by one or more additional computing devices that the computing device that captures the audio stream is in communication with (e.g., via a wired or wireless network), or vice versa. For example, the audio stream, control signals, and information for display may be communicated between the computing devices, such as described with respect to FIG. 1.

FIG. 1 illustrates an example of a computing environment 100 used to provide an interactive computing service 130, according to one embodiment. As shown, the computing environment 100 includes client systems 105, 110, a mobile device 120, and an interactive computing service 130, which are each connected to a network 150. The network 150, in general, may be a wide area network (WAN), local area network (LAN), wireless LAN (WLAN), personal area network (PAN), a cellular network, etc. In a particular embodiment, the network 150 is the Internet.

Client systems 105, 110 are included to be representative of a general purpose computing system, such as a desktop or laptop computer hosting applications used to access the interactive computing service 130. For example, client system 110 includes web browser 112 used to access the interactive computing service 130 by rendering web pages 114 received from the interactive computing service 130. Similarly, client system 105 includes a client application 107. The client application 107 is included to be representative of a component of a client server application (or other distributed application) which can communicate with the interactive service 130 over network 150. Client application 107 may be a "thin" client where the processing is largely directed by the client application 107, but performed by computing systems of the interactive computing service 130 or a conventional software application installed on client system 105. Mobile device 120 is included to be representative of a variety of computing devices, such as a mobile telephone or computing tablet. As shown, the mobile device 120 may access the interactive computing service 130 over network 150 using a mobile web browser 122 or local application or "app" 124 executed on the mobile device 120.

In one embodiment, web browsers 112, 122, client application 107, and app 124 communicate with the interactive computing service 130. For example, in the case where interactive computing service 130 offers a tax-preparation service, web browsers 112, 122, client application 107, and app 124 may provide software which guides a user through preparing a tax return as well as provide users with access to a variety of related features (e.g., self-support content, assisted support content, etc.) available from the interactive computing service 130. Continuing with the tax preparation example, such features may include the ability to file a prepared return, to search for help content, user generated content, etc. related to tax topics, to post questions and answers to questions about the service using an online community, or to provide feedback about the usefulness, quality or relevance of content provided by the interactive application or members of the online community. As described herein, in one embodiment, paralinguistic information from voice/speech of a user may be used to adjust a user experience of the interactive computing service 130.

As shown, the interactive computing service 130 includes a service front-end 131, an application server 137, and a service content database 138. In this example, the interactive computing service 130 is generally modeled as a web server (i.e., service front end 131), an application server 137, and a database (i.e., service content database 138). Of course, other software architectures or distributed application frameworks could be used. Service front-end 131 and application server 137 are included to be representative of physical computing systems, as well as representative of virtual machine instances deployed to a computing cloud. Service front end 131 may communicate with application server 137 to respond to requests from applications on client systems 105, 110, and mobile device 120.

The application server 137 includes an application component 132, search component 133, feedback component 134, ranking component 135, presentation component 136, and speech component 139. Continuing with the example of a tax preparation service, the application component 132 may provide one or more software applications which are used to guide a user in preparing a tax return and to access related features and services, e.g., to interact with self-support content or assisted support content. In one embodiment, the application component 132 may respond to requests from clients by generating hypertext markup language (HTML) and related content passed to clients via the service front-end 131. In some embodiments, the application 107 running on the client 105 and/or the application 124 running on the mobile device 120 could generate information content to present data retrieved from the application server 137. In general, the application component 132 may be implemented using any suitable software programming language, application framework, web service solution stack, virtual application containers, etc., in order to present application features and content to a user.

In some embodiments, the application server 137 may include one or more graphical user interface (GUI) components that interactive computing service 130 can present on client systems 105, 110 and mobile device 120, based on whether a user is interacting with a workflow (via application component 132), searching for information content (e.g., via search component 133), providing feedback for information content (e.g., via feedback component 134), etc. The GUI components may include, for example, HTML components or code that generates HTML components that can be passed to client systems 105, 110 and mobile device 120 and rendered as a user interface. The GUI components may additionally include instructions executable by client systems or mobile devices to display a user interface. The GUI components may additionally include instructions executable by client systems 105, 110 and mobile device 120 to display a user interface using language-specific or operating system-specific GUI components (e.g., instructions for displaying Win32 forms or similar components on other operating system platforms, Abstract Window Toolkit or Swing API components on the Java platform, and so on). Generally, instructions capable of rendering a GUI on client systems 105, 110 and mobile device 120 may include computer executable code generated from compiling and/or interpreting C (or variants thereof), Java, PHP, Ruby, HTML, javascript, Python, AJAX, VBscript, and other programming or scripting languages used to compose and present a GUI. In an example tax preparation application, application server 137 components may include screens for prompting a user for personal information (e.g., name, address, social security number), income information (from W-2s, 1099s, K-1s, and so on), and various deductions and credits that the user may qualify for, structured feedback (e.g., up-down votes, star ratings, etc.), voice-of-customer feedback, etc. The prompts may be for input of such information via voice/speech of the user.

For example, the GUI on client systems 105, 110 and/or mobile device 120 may include a prompt or (e.g., icon, text, button, etc.) that may prompt a user to speak (e.g., ask a query) for example using natural language. The client systems 105, 110 and/or mobile device 120 may receive the audio stream of the speech of the user, such as via a microphone coupled to or integrated with the client systems 105, 110 and/or mobile device 120. The client systems 105, 110 and/or mobile device 120 may transmit the audio stream, via the network 150, to the application server 137.

The speech component 139 may be used to identify the text (e.g., words, query, etc.) of the audio stream of the voice/speech of the user (e.g., by utilizing speech recognition techniques as discussed herein). Further, the speech component 139 may be configured to extract paralinguistic information from the audio stream and determine one or more attributes of the user based on the paralinguistic information (e.g., by utilizing known techniques as discussed herein). The speech component 139 may be configured to provide such identified text and one or more attributes of the user (or paralinguistic information) to the other components of the application server 137.

The search component 133 may be used to allow users to search for content items or features available from the interactive computing service 130. For example, the search component 133 may evaluate service content database 138 to identify content items responsive to a user query (e.g., based on text from the speech component 139) received as voice/speech of the user. In such a case, the search component 133 could identify a variety of content items or services hosted on the interactive computing service 130, such as user guides, feature documentation, as well as user generated content such as questions posted to an online community of users, user blogs, or syndicated forum posts, etc. and/or identify other actions to take, such as routing a user to assisted support, routing a user to receive feedback from the user, etc. In some cases, the search component 133 may use keywords specified in the user query and/or determined attributes of the user (e.g., as identified by the speech component 139) to identify content hosted on the interactive computing service 130. For example, assume a user specifies keywords "tax return" in a search for how to prepare a tax return. In response, the search component 133 may identify content items in the server content database 138 that include the keywords "tax return" specified by the user and the presentation component 136 may present a ranked list of such content items to the user. Further, the ranked list may be ranked based on one or more attributes of the user determined based on paralinguistic information of voice/speech of the user. For example, if the user is older (e.g., over 60) content related to retirement concerns for taxes may be ranked higher. In another example, if the emotional state of the user is negative, user generated content may be ranked higher as opposed to content generated by the interactive computing service 130 developer. In some cases, the content items displayed may be filtered/selected/refined based on the one or more attributes of the user, such that only content that is correlated with the one or more attributes of the user are displayed.

In another example, the search component 133 may use keywords specified in the user query and/or determined attributes of the user (e.g., as identified by the speech component 139) to identify other actions to take. For example, the GUI on client systems 105, 110 and/or mobile device 120 may be modified based on the determined attributes of the user. For example, an older user may be shown a GUI with a more "business" like styling as opposed to a younger user. In another example, the action may be for the interactive computer service 130 to initiate a process (e.g., communication with an assisted support system (e.g., live chat)). For example, if the keywords specified in the voice/speech relate to a query, and an attribute of the user is negative or frustrated, the interactive computer service 130 may initiate an assisted support system for the user and place the user higher in a queue.

In another example, the interactive computing service 130 may prompt the user for feedback regarding the quality and/or usefulness of a content item selected from the list of content items presented to the user. For example, based on whether the feedback was relevant or not to the quality of the information content presented to the user), the interactive computing service 130 may adjust the order/selection of content items in the ranked list for other users of the interactive computing service 130 based on the feedback (e.g., structured feedback, unstructured feedback, paralinguistic information associated with the feedback, etc.). In another example, the interactive computing service 130 may select to prompt or not prompt the user for feedback based on an attribute of the user. For example, there may not be much feedback (e.g., below a threshold, or not recent in time) relating to the determined attribute of the user (e.g., users of a certain age, ethnicity, emotional state, etc.) for certain content, and therefore the interactive computing service 130 may prompt the user for feedback. In another example, the interactive computing service may prompt the user for different feedback (e.g., different surveys) based on the determined attribute of the user. For example, an older user may be given a survey that focuses on the service level provided, while a younger user may be given a survey that focuses on the quality of the content.

The feedback component 134 may be used to capture feedback regarding user experience. For example, a user presented with particular information content responsive to a user query may be prompted to provide structured feedback (e.g., binary up/down votes, star ratings, etc.) regarding the quality and/or usefulness of the information content. In some examples, the user may also be prompted to provide more detailed (unstructured) voice-of-customer feedback to describe the quality and/or usefulness of the information content. As discussed, the voice-of-customer feedback may be input as voice/speech of the user. In turn, the feedback component 134 may evaluate such unstructured voice-of-customer feedback (e.g., received as text from the speech component 139) using natural language processing techniques to identify what topics are referenced in the voice-of-customer feedback. Further, the feedback component 134 may receive information regarding one or more attributes of the user (e.g., from the speech component 139) that provided the voice-of-customer feedback. The feedback component 134 may facilitate correlation of the one or more attributes with the content (e.g., by storing the one or more attributes as metadata associated with the content. As described in more detail below, the ranking component 135 and/or presentation component 136 may use such feedback and one or more attributes of the user to enhance the ranking and/or presentation of information content for users of the online service.

The ranking component 135, for example, may integrate the one or more attributes of the user (e.g., from the speech component 139) with structured feedback and/or unstructured feedback (as opposed to using only structured feedback) to determine a more express indication of user sentiment regarding the user's experience with an online service or regarding some item of help content (including user-generated content). For example, in the case of self-support content (e.g., such as tax questions and answers posted by users of an online tax preparation service) that may be presented to users to aid users in accomplishing a given task (e.g., determining requirements for qualifying for a tax credit), the ranking component 135 may use the one or more attributes of the user (and optionally voice-of-customer feedback) to determine whether there is potential bias in a user's feedback, and adjust the impact that the particular feedback has on a ranking for the information content based on whether there is bias in the feedback.

If the feedback and the one or more attributes positively correlate, e.g., the attribute and the feedback received both indicate adjustment of the ranking of the content in the same direction, the feedback may be used or more heavily weighted in adjusting a ranking of the content, as opposed to if they do not correlate. For example, if the one or more attributes of the user indicate a negative emotional state, and the feedback is a high rating, the feedback may not be used, or may not be heavily weighted in adjusting a ranking of the content. In another example, if the one or more attributes of the user indicate a positive emotional state, and the feedback is a low rating, the feedback may not be used, or may not be heavily weighted in adjusting a ranking of the content. In another example, if the one or more attributes of the user indicate a positive emotional state, and the feedback is a high rating, the feedback may be used, or may be heavily weighted in adjusting a ranking of the content. In another example, if the one or more attributes of the user indicate a negative emotional state, and the feedback is a low rating, the feedback may be used, or may be heavily weighted in adjusting a ranking of the content.

In some cases, the feedback provided by a user can be processed separately or weighted differently depending on where it was collected. In the computing environment 100, for example, the ranking component 135 may evaluate feedback collected from the mobile device 120 differently than feedback collected from client systems 105 and 110.

In another example, the ranking component 135 may rank/select content or other actions identified by the search component 133 based on one or more attributes of the user determined based on paralinguistic information of voice/speech of the user. For example, if the user is older (e.g., over 60) content related to retirement concerns for taxes may be ranked higher. In another example, if the emotional state of the user is negative, user generated content may be ranked higher as opposed to content generated by the interactive computing service 130 developer. In some cases, the content items displayed may be filtered/selected/refined based on the one or more attributes of the user, such that only content that is correlated (e.g., has feedback indicating the content is useful by a user with at least one matching attribute) with the one or more attributes of the user are displayed. In another example, if a user is younger, the content selected for display may be a video (e.g., instructing how to use the application).

The presentation component 136 may be used to select and present information content or perform other actions identified by the search component 133 based on the adjusted rankings and/or correlation of content to one or more attributes of the user. For example, if the ranking for a particular content item has been decreased, the presentation component 136 can reduce the likelihood that the content item will be presented to other users and/or adjust where the content item appears in a list of search results (e.g., a position of the content item in a selection of search results) presented to other users responsive to a search query. Referring to one reference example with five pages of search results, instead of the content item appearing as the first result on page one of the search results presented to the user, the content item may now appear as the third result on page five of a list of search results returned to other users. Similarly, if the ranking for a particular content item has been increased, the presentation component 136 can increase the likelihood that the content item will be presented to other others and/or where the content item appears in a list of information content presented to other users. Further, in another example, the presentation component 136 may present prompts or user interfaces based on actions identified by the search component 133.

Figure 2:
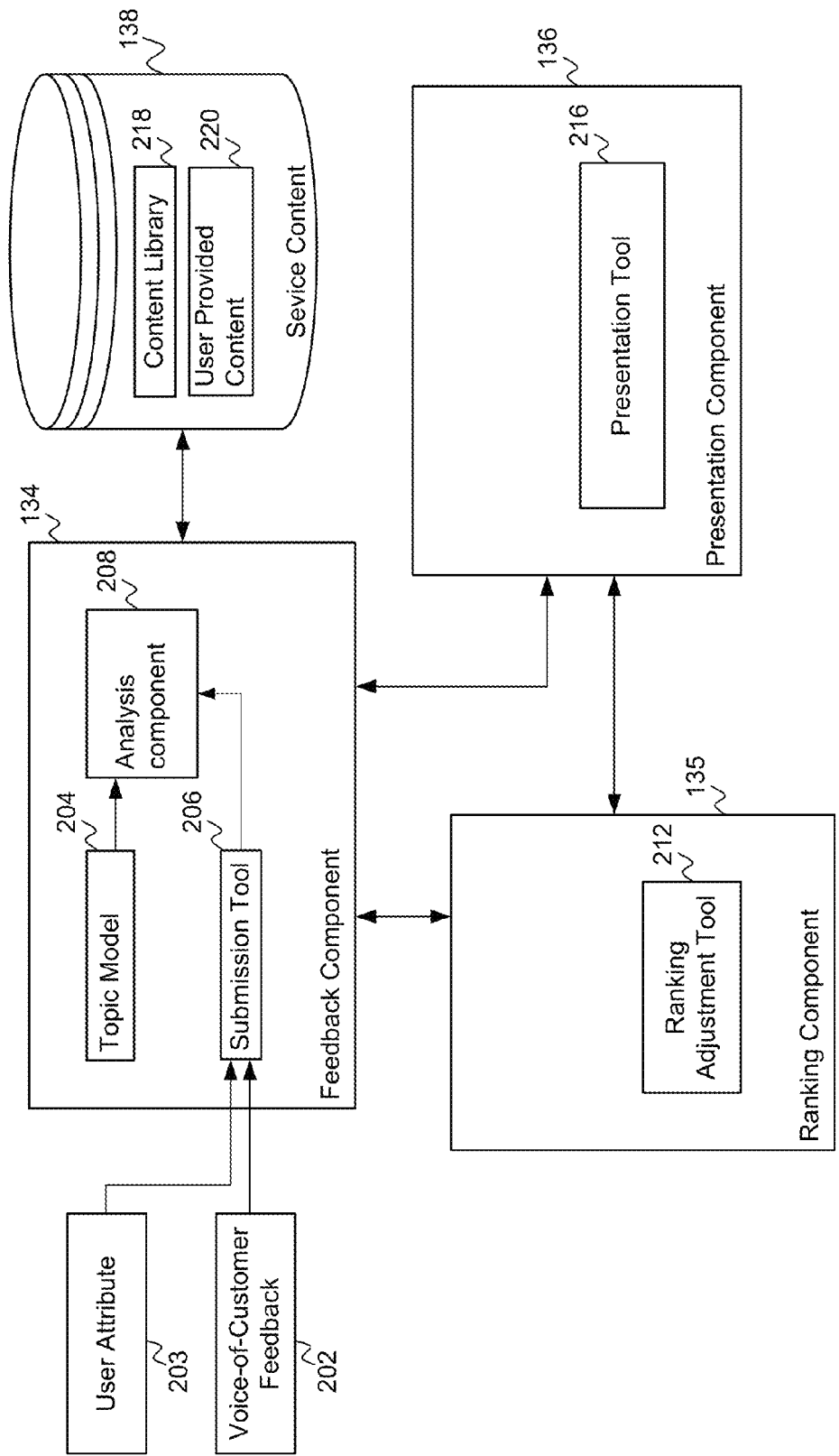
FIG. 2 illustrates components of the interactive computing service used to adjust a user experience of the interactive computing service based on paralinguistic information of a user, in one embodiment.

FIG. 2 further illustrates components of the interactive computing service 130 described relative to FIG. 1, according to one embodiment. As shown, the feedback component 134 interacts with service content database 138 to analyze voice-of-customer feedback 202 and/or one or more attributes of the user 203. The feedback component 134 also interacts with the ranking component 135 and presentation component 136 to adjust rankings and/or presentation of information content based on the feedback 202 and/or one or more attributes of the user 203.

The feedback component includes a topic model 204, a submission tool 206, and an analysis component 208. As noted above, in response to receiving a search query (e.g., via the search component 133) for particular content or features provided by the interactive computing service 130, the interactive computing service 130 may evaluate content library 218 and user-generated content 220 to identify content responsive to the search query. For example, if the search query is for information regarding "itemized deductions," the interactive computing service 130 may return documents such as user guides, user-generated content, etc. that include the phrase "itemized deductions."

In one embodiment, the topic model 204 may be a probabilistic topic model (e.g. a Latent Dirichlet Allocation (LDA) model). The LDA model may have been trained over the same content repository (e.g., content library 218 and user-generated content 220) evaluated by the search component 133. For example. in addition to documents from the content library 218, the training data may also include a collection of voice-of-customer feedback in the user-generated content 220 that does not directly reference topics in the content library 218 (e.g., feedback simply criticizing the online service). Doing so allows the resulting LDA model to identify topics in voice-of-customer feedback.

Once trained, the topic model 204 may evaluate the voice-of-customer feedback to identify a set of topics referenced by the voice-of-customer feedback and metadata for each topic. The metadata may provide a probability (or measure of confidence) that a given topic is actually referenced in the feedback and a set of keywords representing the given topic.

The interactive computing service 130 may prompt the user to provide voice-of-customer feedback 202 regarding the usefulness or quality of the information content presented to the user in response to the search query in the form of voice/speech input of the user. In one embodiment, the feedback component 134 prompts the user for structured feedback and/or unstructured feedback via the submission tool 206. In situations where unstructured feedback is received via the submission tool 206, the submission tool 206 may evaluate the feedback 202 and/or one or more attributes of the user 203 that provided the feedback (e.g., from the search component 133) using the analysis component 208 and the topic model 204. That is, the analysis component 208 may evaluate the feedback 202 relative to the topic model 204 to identify a set of one or more topics believed to be referenced in the feedback 202. The topic model 204 provides a statistical model which can identify a set of topics referenced in the feedback 202 (and a relative measure of how much of the feedback may be about a given topic) and can be used by the search component 133 to identify content associated with keywords related to the topics. For example, for a particular set of feedback received from a user, the topic model 204 could predict that 80% of the feedback is related to a tax filing status and 20% related to another topic.

The topic model may be built relative to an underlying set of data hosted on the interactive computing service 130. Such data may include documents, user guides, etc., in content library 218 as well as user generated content 220 in service content database 138. Generally, a "topic" may be represented as a cluster of words that occur together frequently in documents (or other items) in the service content database 138. The label for a topic may be assigned by a subject matter expert or selected as one of the keywords in a given topic. For example, different clusters of words may be presented to a subject matter expert. The subject matter expert may evaluate the clusters of words and assign a topic to each cluster. For example, the subject matter expert could determine that a first cluster of words relates to "spousal privilege," a second cluster of words relates to "student loans," a third cluster of words relates to "capital gains," and so on. Once a topic is assigned to various different clusters of words, the topic model may be built by analyzing clusters of words in documents (and other items) in the content database 138, and labeling the clusters in each document with respective topics. Using the above example, if the first cluster of words is found in the documents, these words would be labeled with the topic "spousal privilege," and so on. In some cases, a given cluster of words in the documents (of content database 138) may be related to multiple different topics, and therefore be assigned different percentages for the different topics. Continuing with the above example, if a given cluster of words relates to "spousal privilege and student loans", this cluster of words might be labeled as 60% related to "spousal privilege" and 40% related to "student loans", or some other percentage based on how much of the cluster of words relates to a given topic. In a particular embodiment, topic model 204 is a LDA model generated from the service content database 138. However, other probabilistic topic models, e.g., such as the correlated topics model, etc., may be used. Additionally, as the content in service content database 138 changes over time, the topic model 204 may be regenerated at times determined by the service provider.

The analysis component 208 can also evaluate the one or more attributes of the user 203 to determine user sentiment regarding information content. For example, the analysis component 208 can use the emotional state of the user to determine a quality of user experience relative to the information content presented to the user.

As shown, the ranking component 135 includes a ranking adjustment tool 212. The ranking component 135 can use the ranking adjustment tool 212 to adjust the ranking of the information content that was presented to the user based on the feedback that is related to the quality and/or usefulness of the information content and/or one or more attributes of the user. For example, the ranking component 135 can use the analysis component 208 to determine a sentiment regarding such information content from the one or more attributes of the user 203. The ranking component 135 may further correlate the identified information content with the one or more user attributes, such that a ranking of the content may be adjusted by the ranking adjustment tool 212 for different users based on the one or more attributes of the user.

Further, different content associated with different topics may have different probability of being useful for users based on the attribute of a user. For example, user generated content associated with a cost topic may have a higher probability of usefulness to a user than developer generated content associated with a cost topic based on feedback received from users including the attributes of the user. Accordingly, the ranking adjustment tool 212 may adjust the rankings of different content for a given topic based on attributes of the users that provide feedback and the topic itself, such as based on an LDA model generated from the service content database 138 and feedback provided from the users.

In one embodiment, the presentation component comprises a presentation tool 216. The presentation tool 216 may be configured to select and present information content or perform other actions identified by the search component 133 based on the adjusted rankings of the ranking adjustment tool 212 and/or correlation of content to one or more attributes of the user. For example, if the ranking for a particular content item has been decreased, the presentation tool 216 can reduce the likelihood that the content item will be presented to other users and/or adjust where the content item appears in a list of search results (e.g., a position of the content item in a selection of search results) presented to other users responsive to a search query. Referring to one reference example with five pages of search results, instead of the content item appearing as the first result on page one of the search results presented to the user, the content item may now appear as the third result on page five of a list of search results returned to other users. Similarly, if the ranking for a particular content item has been increased, the presentation tool 216 can increase the likelihood that the content item will be presented to other others and/or where the content item appears in a list of information content presented to other users. Further, in another example, the presentation tool 216 may present prompts or user interfaces based on actions identified by the search component 133.

Figure 3B:
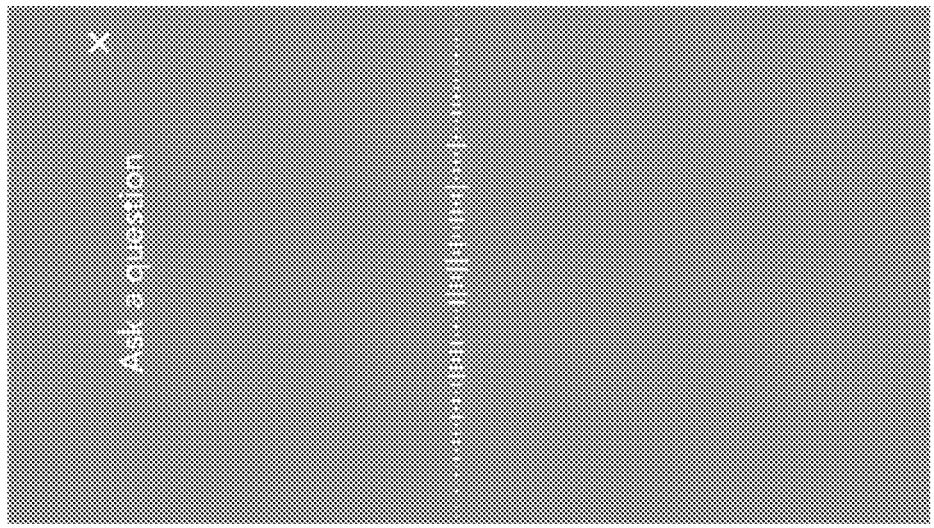
FIGS. 3A-3D illustrate a graphical user interface for the interactive computing service, in one embodiment.
Figure 3A:
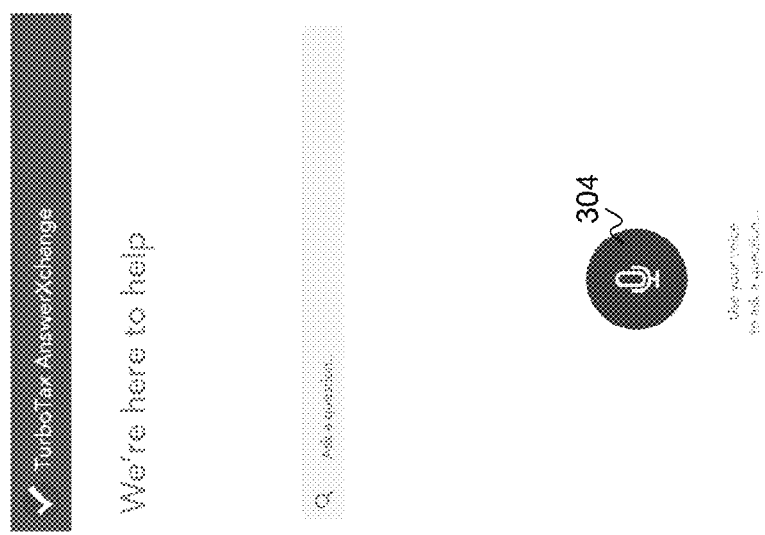
Figures 3C, 3D:
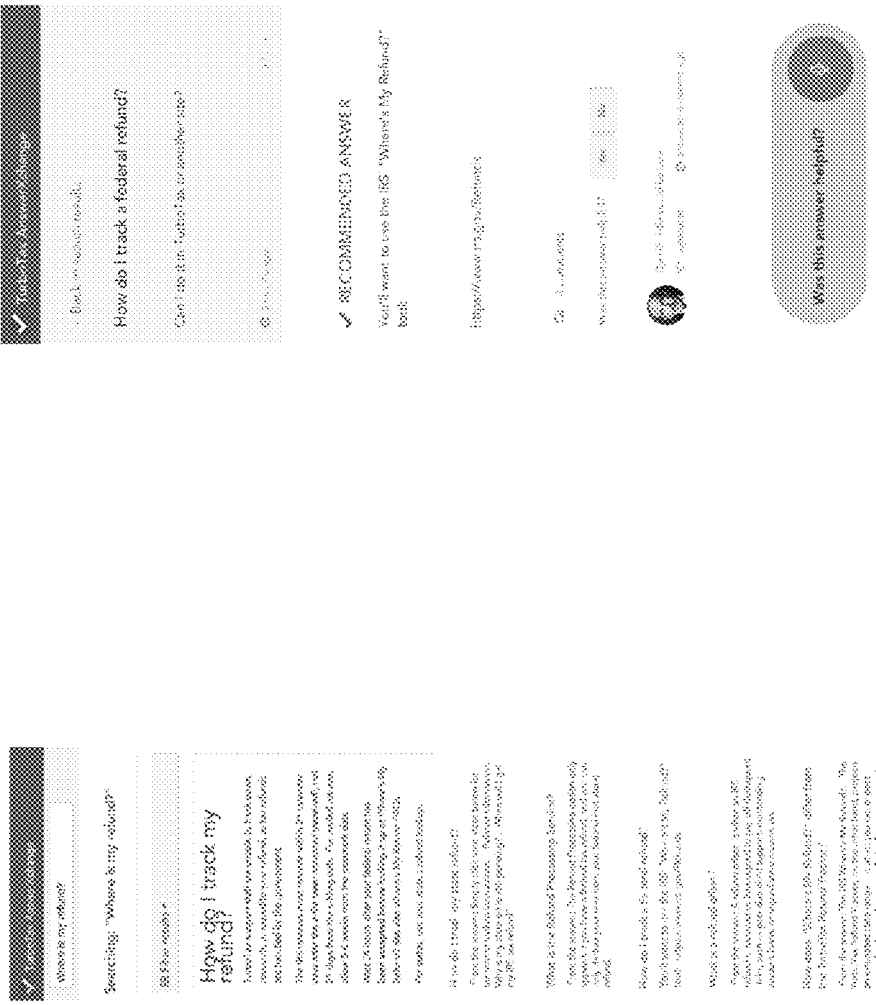

FIGS. 3A-3D illustrate a GUI for capturing the voice/speech of a user. As shown in FIG. 3A, a user is given a prompt to use their voice/speech to control the software application (e.g., online service 130), as displayed on a device (e.g., mobile device 120). The user may, for example, provide an input (e.g., touch on a touch screen of the mobile device 120) at an icon 304 to cause the mobile device 120 to accept a voice/speech of the user as input. The software application may then display a screen as shown in FIG. 3B on the mobile device 120 prompting the user to begin speaking and/or displaying that the mobile device 120 is capturing an audio stream. Further, as discussed above, the software application may determine a number of content items related to the content of the voice/speech of the user, and rank the content items based on determined attributes of the user, and display the ranked results as shown in FIG. 3C on the mobile device 120. A user may provide an input on one of the displayed results in FIG. 3C to see details of the results, such as shown in FIG. 3D. The user may be further prompted to provide feedback as voice/speech regarding the selected content, as shown at the bottom of FIG. 3D.

Figure 4:
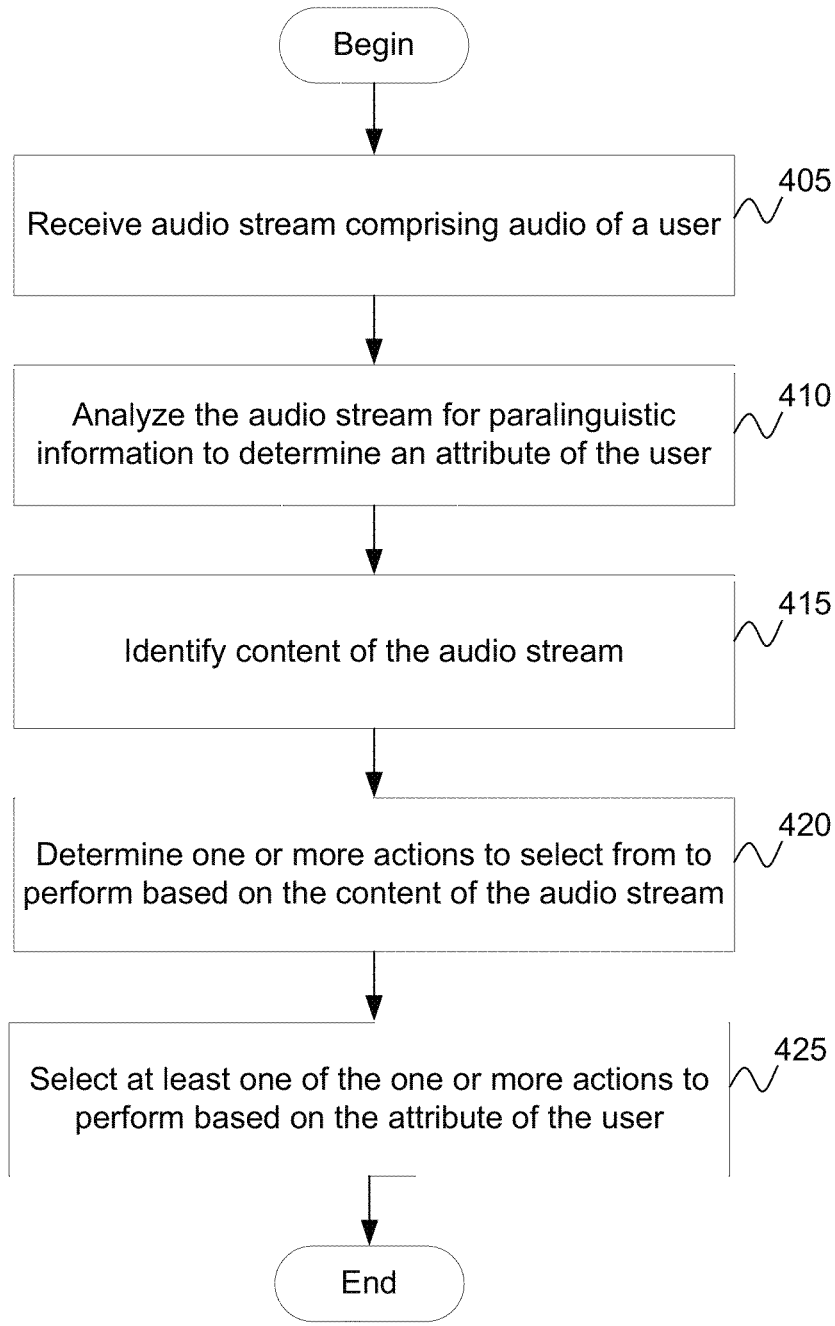
FIG. 4 illustrates a method for adjusting a user experience of a software application, according to one embodiment.

FIG. 4 illustrates a method 400 for adjusting a user experience of a software application. At 405, an audio stream comprising audio (e.g., voice/speech of a user is received at a device (e.g., mobile device, device in communication with the mobile device, etc.) such as via a microphone. At 410, the device analyzes the audio stream for paralinguistic information to determine an attribute of a user. For example, paralinguistic information in the audio stream spoken by the user may be extracted and used to identify an attribute of the user.

At 415, the device identifies content of the audio stream. For example, the device may utilize speech recognition to identify words (e.g., a query, keywords, etc.) in the audio stream. At 420, the device determines one or more actions (e.g., display of one or more content items relating to a topic identified by the words of the audio stream, requesting feedback, displaying a first survey or a second survey, etc.).

At 425, the device selects at least one of the one or more actions to perform based on the determined one or more attributes of the user. For example, the device may select to display one content item over another, rank content items, etc., based on ethnicity, emotional state, age, etc. of the user. For example, a user with a negative emotional state may be more likely to respond well to user generated content as opposed to developer related content, and therefore the user generated content may only be selected for display, or may be displayed as a higher ranking result. In another example, the at least one or more actions to perform is further based on a topic related to the content identified by the audio stream. For example, certain topics may have different rankings for content based on attributes of the user. In one example, if the content is related to a cost topic, then if a user has a negative emotion, content that is user generated may be ranked higher assisted support. However, if the content is related to a usability topic, then if a user has a negative emotion, content that is user generated may be ranked lower than assisted support. For example, the issue may be that the user does not know how to use the online service and by connecting the user with assisted support, the user may be better served. Similar examples may be described in U.S. Pat. No. 8,468,110, granted Jun. 18, 2013, which is hereby expressly incorporated by reference in its entirety.

Figure 5:
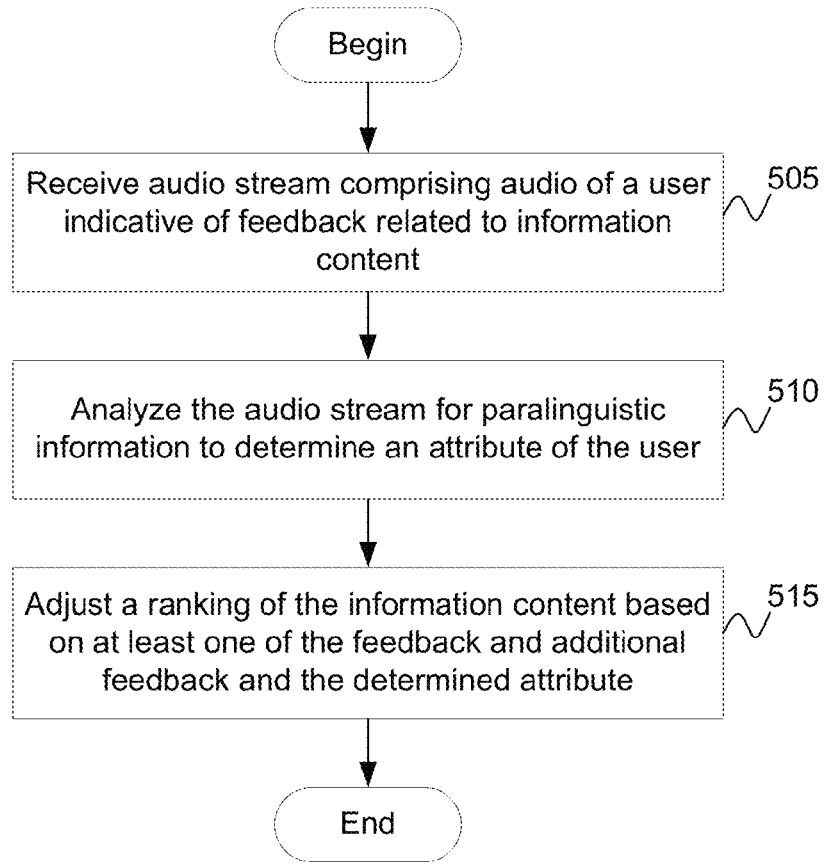
FIG. 5 illustrates a method for adjusting a ranking of information content based on feedback of a user and one or more attributes of the user, according to one embodiment.

FIG. 5 illustrates a method 500 for adjusting a ranking of information content based on feedback of a user and one or more attributes of the user. At 505, an audio stream comprising audio (e.g., voice/speech of a user is received at a device (e.g., mobile device, device in communication with the mobile device, etc.) such as via a microphone. The audio may be indicative of feedback (e.g., unstructured feedback) for information content. At 510, the device analyzes the audio stream for paralinguistic information to determine an attribute of a user. For example, paralinguistic information in the audio stream spoken by the user may be extracted and used to identify an attribute of the user.

At 515, the device adjusts a ranking of the information content based on at least one of the feedback and other feedback and the determined attribute of the user. For example, the other feedback may comprise structured feedback such as a star rating, or other value rating of the information content. The device may determine if the one or more the one or more attributes and the feedback and/or other feedback positively correlate, e.g., the attribute and the feedback received both indicate adjustment of the ranking of the content in the same direction, the feedback may be used or more heavily weighted in adjusting a ranking of the content, as opposed to if they do not correlate.

Figure 6:
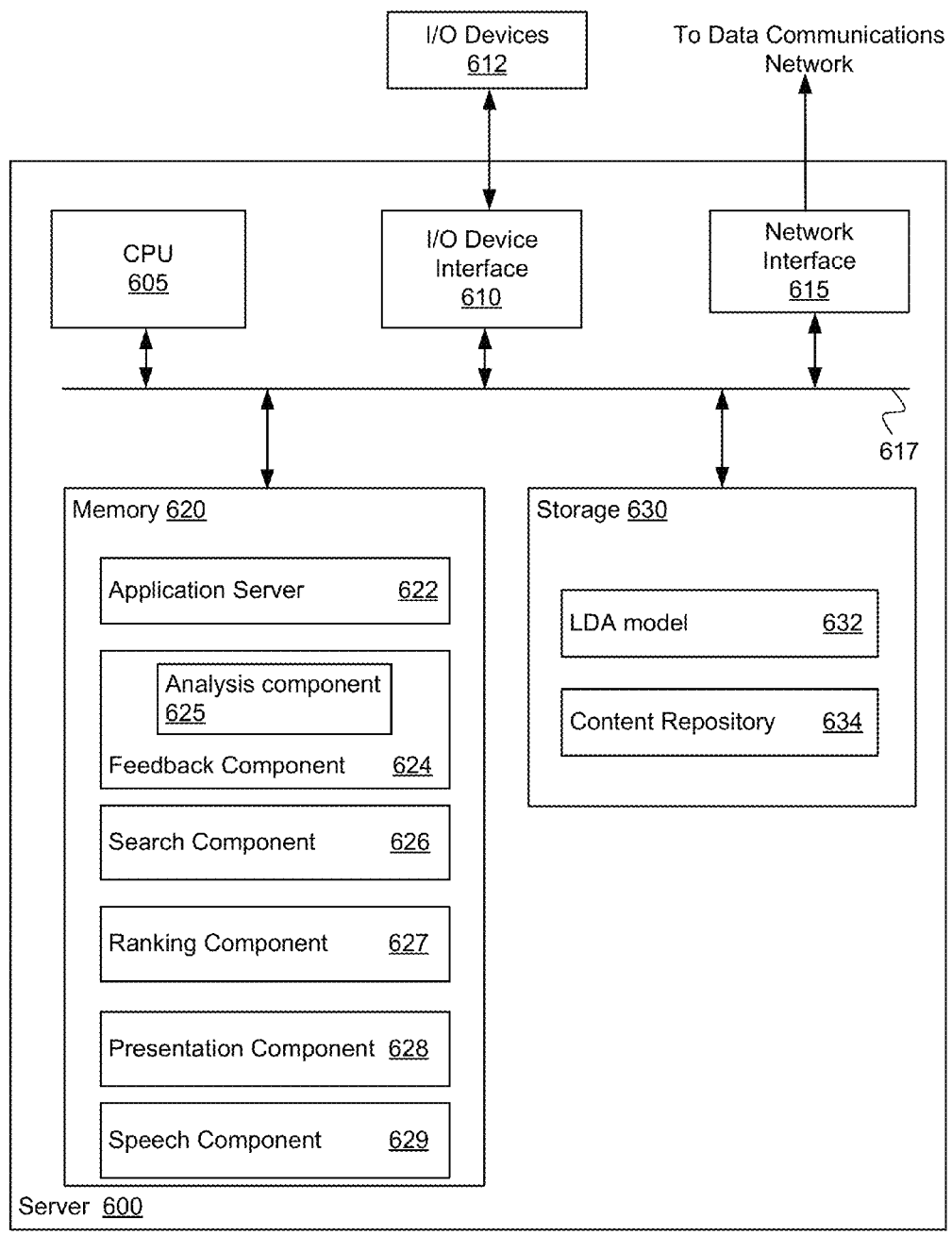
FIG. 6 illustrates an example computing system used to adjust a user experience of the interactive computing service based on paralinguistic information of a user, according to one embodiment.

FIG. 6 illustrates an example computing system 600 used to adjust a user experience based on paralinguistic information of a user, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stored in the storage 630. The bus 617 is used to transmit programming instructions and application data between the CPU 605, I/O device interface 610, storage 630, network interface 615, and memory 620. Note, CPU 605 is included to be representative of a single CPU, multiple CPUs, a single CPU having multiple processing cores, and the like, and the memory 620 is generally included to be representative of a random access memory. The storage 630 may be a disk drive or flash storage device. Although shown as a single unit, the storage 630 may be a combination of fixed and/or removable storage devices, such as fixed disc drives, removable memory cards, optical storage, network attached storage (NAS), or a storage area-network (SAN).

Illustratively, the memory 620 includes an application server 622, a feedback component 624, a search component 626, a ranking component 627, a presentation component 628, and a speech component 629. Storage 630 includes an LDA topic model 632 and a content repository 634. Storage 630 may also include other topic models, such as a CTM. As described, the application server 622 provides the underlying logic and functionality for an application accessed by users, e.g., an online interactive tax-preparation service. The application server 622 may also provide users with access to content and features associated with the online interactive service, such as the hosting of online communities or forums where users can post and respond to questions, topics, and comments about the application or online service. The search component 626 may be used to search for content in the content repository 634 (e.g., search the question/answer exchange forum of an online community) as well as to search for service documentation regarding features or workflows supported by the online interactive service. As noted, users may compose a search query by specifying a set of keywords or phrases. The speech component 629 may be configured to analyze voice/speech of a user to extract keywords and paralinguistic information of the user to determine one or more attributes of the user.

Feedback component 624 may be used to capture feedback regarding user experience. For example, the feedback component 624 may prompt the user for structured and/or unstructured feedback regarding the quality and/or usefulness of the information content. The feedback component may use the analysis component 625 to evaluate unstructured voice-of-customer feedback and/or one or more attributes of the user. As described, the analysis component 625 may use LDA topic model 632 to identify topics referenced by the voice-of-customer feedback and associated topic metadata.

Ranking component 627 may be used to determine use one or more attributes of the user, and adjust ranking of information content based on the attributes of the user. Ranking component 627 may also adjust ranking of information based on structured and/or unstructured feedback from the user.

The presentation component 628 may be used to modify information content based on adjusted ranking. Alternatively, or additionally, the presentation component 628 can identify, which content or other actions to present to the user.

Advantageously, adjusting rankings of information content and/or presenting information content or other actions based on attributes of the user determined based on paralinguistic information improves the performance of the online service and the quality of users' experience when searching for information content provided by the online service.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for adjusting a user experience of a software application, the method comprising:
   receiving, at a computing device, an audio stream comprising audio of a user;
   analyzing, by the computing device, the audio stream for paralinguistic information to determine an attribute of the user;
   identifying, by the computing device, content of the audio stream;
   determining, by the computing device, a plurality of content for display in a graphical user interface based on the content of the audio stream;
   ranking, by the computing device, the plurality of content based on the attribute of the user; and
   selecting, by the computing device, at least one of the plurality of content based on the ranking of the plurality of content to display in the graphical user interface.

2. The method of claim 1, wherein the attribute of the user comprises at least one of gender of the user, age of the user, ethnicity of the user, and emotional state of the user.

3. The method of claim 1, wherein the plurality of content comprises: at least one previously generated content item related to the content of the audio stream, and content for facilitating connection of the user to an assisted support system.

4. The method of claim 1, wherein the plurality of content comprises: a first content item related to the content of the audio stream, and a second content item related to the content of the audio stream.

5. The method of claim 4, further comprising ordering presentation of the first content item and the second content item based on the attribute of the user.

6. The method of claim 1, wherein the plurality of content comprises: a first survey, and a second survey.

7. The method of claim 1, further comprising identifying one or more topics based on the content of the audio stream, wherein each of the plurality of content is associated with at least one of the one or more topics, and wherein selecting at least one of the plurality of content is further based on the one or more attributes is further based on the at least one of the one or more topics associated with each of the plurality of content.

8. A computing device for adjusting a user experience of a software application, the computing device comprising:
   a memory; and
   a processor configured to:
   receive an audio stream comprising audio of a user;

analyze the audio stream for paralinguistic information to determine an attribute of the user;

identify content of the audio stream;

determine a plurality of content for display in a graphical user interface based on the content of the audio stream;

rank the plurality of content based on the attribute of the user; and select at least one of the plurality of content based on the ranking of the plurality of content to display in the graphical user interface.

9. The computing device of claim 8, wherein the attribute of the user comprises at least one of: gender of the user, age of the user, ethnicity of the user, and emotional state of the user.

10. The computing device of claim 8, wherein the plurality of content comprises: at least one previously generated content item related to the content of the audio stream, and content for facilitating connection of the user to an assisted support system.

11. The computing device of claim 8, wherein the plurality of content comprises: a first content item related to the content of the audio stream, and a second content item related to the content of the audio stream.

12. The computing device of claim 11, wherein the processor is further configured to order presentation of the first content item and the second content item based on the attribute of the user.

13. The computing device of claim 8, wherein the plurality of content comprises: a first survey, and a second survey.

14. The computing device of claim 8, wherein the processor is further configured to identify one or more topics based on the content of the audio stream, wherein each of the plurality of content is associated with at least one of the one or more topics, and wherein selecting at least one of the plurality of content is further based on the one or more attributes is further based on the at least one of the one or more topics associated with each of the plurality of content.

15. A computing device for adjusting a user experience of a software application, the computing device comprising:

means for receiving an audio stream comprising audio of a user;

means for analyzing the audio stream for paralinguistic information to determine an attribute of the user;

means for identifying content of the audio stream;

means for determining a plurality of content for display in a graphical user interface based on the content of the audio stream;

means for ranking the plurality of content based on the attribute of the user; and means for selecting at least one of the plurality of content based on the ranking of the plurality of content to display in the graphical user interface.

16. The computing device of claim 15, wherein the attribute of the user comprises at least one of: gender of the user, age of the user, ethnicity of the user, and emotional state of the user.

17. The computing device of claim 15, further comprising means for identifying one or more topics based on the content of the audio stream, wherein each of the plurality of content is associated with at least one of the one or more topics, and wherein selecting at least one of the plurality of content is further based on the one or more attributes is further based on the at least one of the one or more topics associated with each of the plurality of content.

18. A non-transitory computer-readable medium comprising instructions that when executed by a computing device cause the computing device to perform a method for adjusting a user experience of a software application, the method comprising:

receiving, at the computing device, an audio stream comprising audio of a user;

analyzing the audio stream for paralinguistic information to determine an attribute of the user;

identifying content of the audio stream;

determining a plurality of content for display in a graphical user interface based on the content of the audio stream;

ranking the plurality of content based on the attribute of the user; and selecting at least one of the plurality of content based on the ranking of the plurality of content to display in the graphical user interface.

19. The non-transitory computer-readable medium of claim 18, wherein the attribute of the user comprises at least one of gender of the user, age of the user, ethnicity of the user, and emotional state of the user.

20. The non-transitory computer-readable medium of claim 18, wherein the method further comprises identifying one or more topics based on the content of the audio stream, wherein each of the plurality of content is associated with at least one of the one or more topics, and wherein selecting at least one of the plurality of content is further based on the one or more attributes is further based on the at least one of the one or more topics associated with each of the plurality of content.

* * * * *